United States Patent [19]

Brooks

[11] 4,137,029

[45] Jan. 30, 1979

[54] ORGANIC MATERIAL TREATMENT APPARATUS

[75] Inventor: Alfred W. Brooks, St. Thomas, Canada

[73] Assignee: Cannon Limited, Hamilton, Bermuda

[21] Appl. No.: 834,735

[22] Filed: Sep. 19, 1977

[51] Int. Cl.$^{2}$ .................... B29B 1/02

[52] U.S. Cl. .................... 425/222; 432/118; 34/168; 23/313 R

[58] Field of Search .................... 425/222; 259/3; 264/310; 432/103, 118; 23/252 R, 313 R, 314; 34/168, 175

[56] References Cited

U.S. PATENT DOCUMENTS

| | | | |
|---|---|---|---|
| 1,857,785 | 5/1932 | Holzapfel | 432/118 X |
| 2,314,836 | 3/1943 | Seil | 432/118 X |
| 3,145,979 | 8/1964 | Madsen | 432/118 X |
| 3,641,683 | 2/1972 | Preeman | 432/118 X |
| 4,014,643 | 3/1977 | Musha et al. | 432/118 |

FOREIGN PATENT DOCUMENTS

| | | | |
|---|---|---|---|
| 488569 | 12/1952 | Canada | 425/222 |
| 627650 | 9/1961 | Canada | 425/222 |

*Primary Examiner*—Robert L. Spicer, Jr.

*Attorney, Agent, or Firm*—Rogers, Bereskin & Parr

[57] ABSTRACT

A method and apparatus are disclosed for drying and pelletizing organic material such as animal waste, sewage and the like. The organic material is dried in two stages using a high temperature, rotating primary drying drum, and a lower temperature secondary louvred drying drum. The primary drum includes an inlet section and an outlet section. The inlet section includes a plurality of transverse chain curtains for increased heat transfer to the organic material, for breaking up the organic material and for cleaning the sides of the drum. The primary drum outlet section includes a plurality of vanes angularly attached to the inside of the drum to form an auger to retain the material in the drum until it is partially dried to a desired level. The organic material is then transported to the secondary louvred layer. The louvred dryer includes an input section, an output section and a central pelletizing section formed by adjacent portions of the input and output sections. The louvred dryer input section is connected to a supply of heated air and the louvred dryer output section is connected to a supply of cooling air. An adjustable baffle is located in the pelletizing section for use when it is desired to pelletize the organic material. The baffle defines a continuous cylindrical rolling surface which blocks the air flow through the louvres in the pelletizing section and which rolls the organic material to form pellets. The longitudinal location and the longitudinal length of the baffle may be adjusted for controlling the point where pelletizing begins and for controlling the size of the pellets. Suitable air-pollution apparatus is provided to prevent atmospheric pollution.

21 Claims, 12 Drawing Figures

FIG. 1
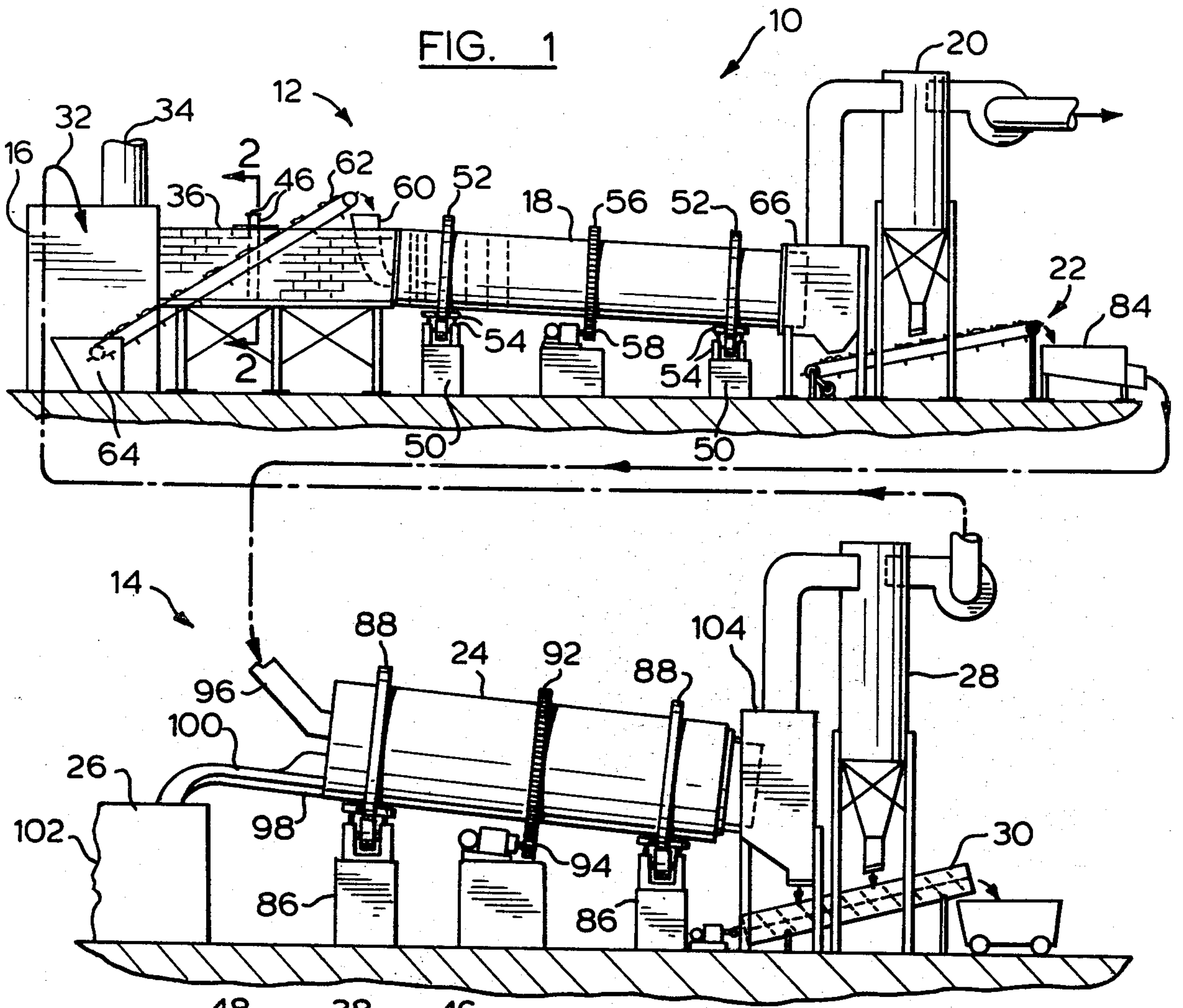
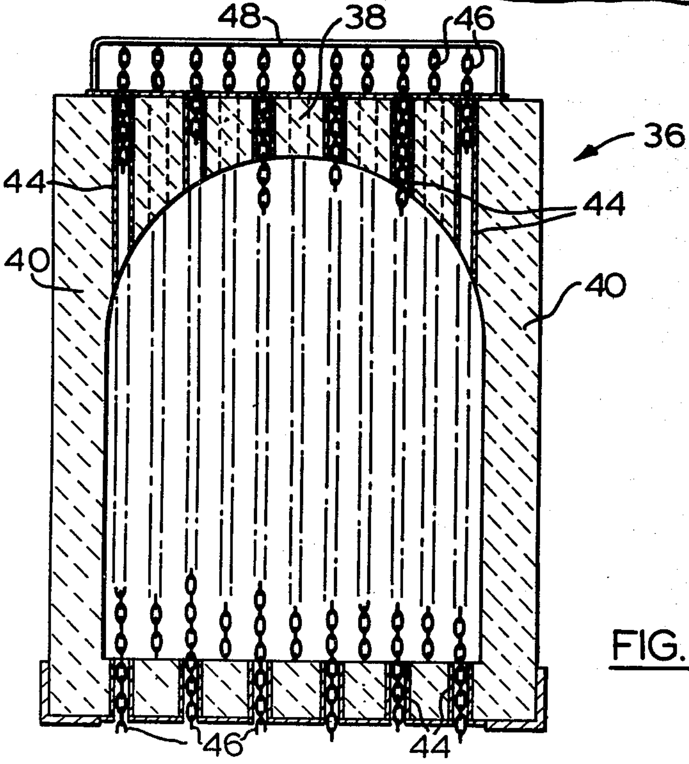
FIG. 2

ORGANIC MATERIAL TREATMENT APPARATUS

This invention relates to a method and apparatus for drying and for pelletizing organic material such as animal waste, sewage and by-products or waste materials from the production or processing of food. In particular, the invention relates to a two-stage drying or dehydrating operation where high moisture content but inflammable organic material is dried or dehydrated at very high temperatures. This dried organic material makes a very uniform, high quality agricultural fertilizer.

In the past, rotating drying drums or kilns have been used to dry or heat treat many different types of materials. These drums are usually connected to a furnace and a blower or fan for blowing or drawing heated air through the drum. This heated air comes into contact with and thus dries the material located in the drum.

Various problems have been encountered with this type of equipment, and these problems are usually peculiar to the specific material that is required to be dried or heat treated. For example, with some materials combustion or explosion inside the drying drum is a problem. In other cases, the material to be dried may have a tendency to cake or stick to the inside surfaces of the drum. Other materials may be difficult to pass through the drum resulting in nonuniform drying or heat damage to the end product.

In regard to the heated air used to do the actual drying, it is generally recognized that it is desirable to have the ratio of the input temperature to the output temperature of the air as high as possible to maximize the efficiency of the drying operation. This usually means that the input air temperature must be very high, for example, up to 2,000° F., since it is often not possible to lower the output air temperature below certain limits or excessive condensation problems arise. In the past, such high efficiency drying kilns have been designed to handle certain specific materials, but these kilns have generally not been able to effectively accommodate various diverse materials, and especially waste products having moisture contents above approximately 60 or 70% by weight.

The present invention provides a two-stage method and apparatus for efficiently drying various types of material, and in particular, high moisture content animal waste and sewage, and yet the invention generally produces a uniform, high quality end product, which is especially useful as fertilizer.

According to one aspect of the invention, there is provided a method of drying and pelletizing organic material such as sewage. The method comprises the steps of introducing the organic material into a rotating louvred drying drum having longitudinal, circumferentially spaced-apart, radially inwardly disposed louvres, said drum having an input section, an output section and a central pelletizing section formed by adjacent portions of the input and output sections. Heated air is passed through the louvred drying drum input section louvres to dry the material, said air being at a temperature between 500 and 800° F. and at a velocity through the drum between 200 and 400 feet per minute. Cooling air is passed through the louvred drying drum output section louvres to cool the material. Also, the flow of heated air and cooling air through the louvres in the pelletizing section is interrupted by closing the louvres to form a cylindrical rolling surface in the pelletizing section, whereby the organic material is rolled in the pelletizing section to form pellets.

According to another aspect of the invention there is provided a method of drying organic material such as animal waste or sewage. The method comprises the steps of introducing the material into a elongate rotating primary drying drum having an inlet section and an outlet section. A stream of air is passed through the primary drum, said air stream being heated to a temperature between 800 and 2,000° F., and said air stream having a velocity between 350 and 600 feet per minute. The organic material is contacted in the inlet section with a plurality of chains suspended from the walls of the primary drum. The organic material is lifted into the air stream in the outlet section by a plurality of auger vanes attached to the walls of the primary drum, said vanes being angularly disposed so that the material tends to move contra the direction of the stream of air. The rate of introduction of organic material into the primary drum is controlled to maintain the moisture content of the organic material emerging from the primary drum at a predetermined initial level. The organic material emerging from the primary drum is introduced into a rotating secondary louvred drying drum, the secondary drum having an input section and an output section. Also, heated air is passed through the secondary drum louvres in the input section, and cooling air is passed through the secondary drum louvres in the output section, whereby the organic material is dried in the secondary drum to a desired predetermined final level.

According to yet another aspect of the invention, there is provided apparatus for drying and pelletizing organic material such as sewage. The apparatus comprises an elongate, rotatable, louvred drying drum having longitudinal, circumferentially spaced-apart, radially inwardly disposed louvres. The drying drum includes an input section, an output section and a central pelletizing section formed by adjacent portions of the input and output sections. The input section is adapted to be connected to a supply of heated air at a temperature between 500 and 800° F. The output section is adapted to be connected to a supply of cooling air. Means are provided for feeding organic material into the input section, and means are provided for rotating the louvred drying drum. Means are also provided for passing the heated air and cooling air through the louvres in the respective input and output sections to dry and cool the organic material. Means are also provided for moving the organic material through the drying drum from the input to the output sections. An adjustable baffle is located in the pelletizing section for blocking the airflow through the louvres in said pelletizing section. The baffle defines a continuous cylindrical rolling surface for rolling the organic material to form pellets. Means are provided for adjusting the longitudinal location of the rolling surface to control the location of the rolling of the organic material. Also, means are provided for adjusting the longitudinal length of the rolling surface, whereby the duration of rolling and thus the size of the organic material pellets is controlled.

According to a still further aspect of the invention, there is provided apparatus for drying organic material such as animal waste or sewage. The apparatus comprises a rotatable, elongate primary drying drum having an inlet section and an outlet section. Means are provided for feeding organic material into the inlet section. An air supply throat is connected to the primary drum and adapted to be connected to a supply of air heated to a temperature between 800 and 2,000° F. Means are provided for passing the heated air through said throat and thus through the primary drum. Means are provided for rotating the primary drum. The inlet section of the drum includes a plurality of transverse chain curtains. The chain curtains include a plurality of chains attached at one end to the inside of the drum. The outlet section of the drum includes a plurality of vanes attached to the inside of the primary drum, these vanes being angularly disposed to form an auger tending to move the organic material in a direction contra the flow of said heated air. Means are provided for moving the organic material through the primary drum. An elongate, rotatable, secondary louvred drying drum is provided having longitudinal, peripheral, radially inwardly disposed louvres, the secondary drum having an input section and an output section. The input section is adapted to be connected to a supply of air heated to a temperature between 500 and 800° F., and said output section is adapted to be connected to a supply of cooling air. Means are provided for passing the heated air and the cooling air through the louvres in the respective input and output sections. Means are also provided for rotating the secondary drum. Transport means are provided for conveying the organic material from the primary drum outlet section to the secondary drum input section. Also, means are provided for moving the organic material through the secondary drum, so that the organic material may be partially dried in the primary drum and further dried in the secondary drum to a predetermined desired dry moisture level.

Preferred embodiments of the invention will now be described, by way of example, with reference to the accompanying drawings, in which:

FIG. 1 is an elevational, partly schematic view of a preferred embodiment of a two-stage drying apparatus according to the present invention;

FIG. 2 is a vertical sectional view taken along lines 2—2 of FIG. 1;

Figure 3:
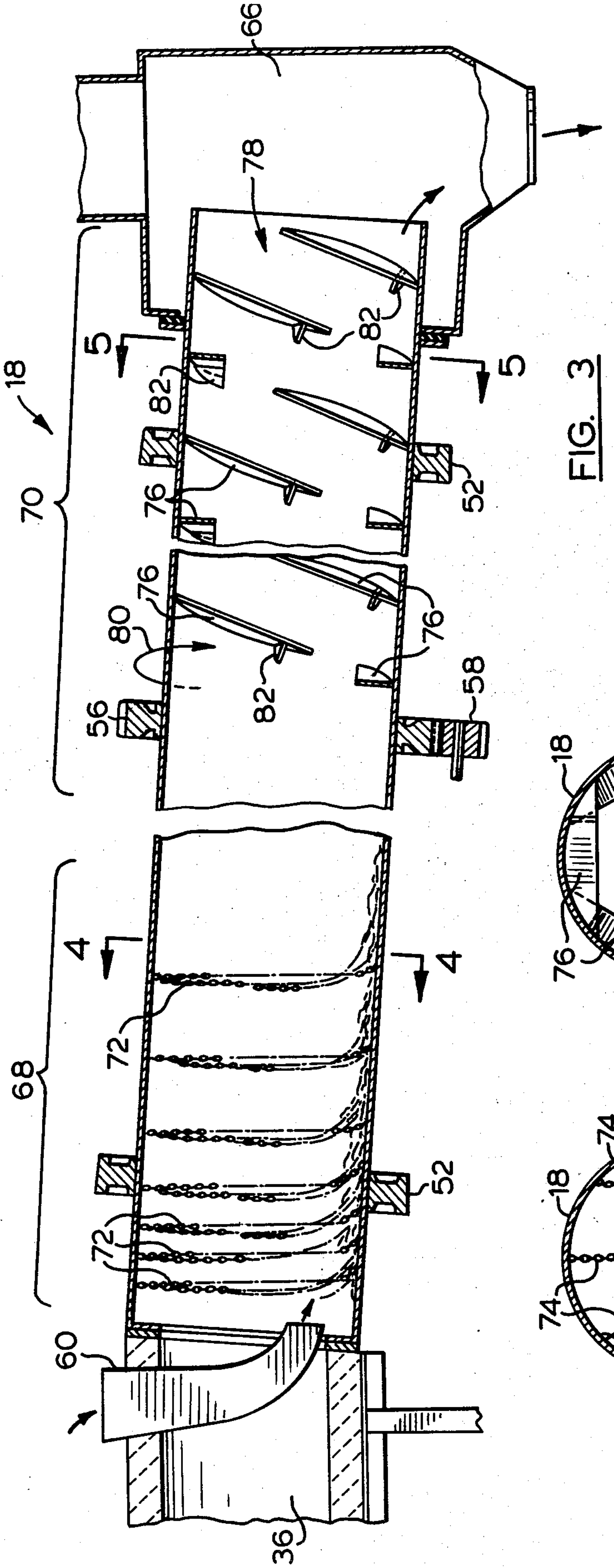
FIG. 3 is a longitudinal, vertical sectional view of the primary drying drum of the apparatus shown in FIG. 1.

Referring firstly to FIG. 1, a preferred embodiment of apparatus for drying organic material is generally indicated by reference numeral 10. Drying apparatus 10 includes a primary drying stage 12 and a secondary drying stage 14. The organic material is initially processed through primary drying stage 12 to remove approximately 60% of the moisture in the material, and then the material is processed through secondary drying stage 14 to dry the organic material until it has a moisture content of less than 10% by weight.

Primary drying stage 12 includes a furnace 16 for supplying heated air to a primary drying drum 18. A cyclone type air fan 20 draws the heated air and the organic material through primary drying drum 18. The organic material emerging from primary drying drum 18 is transported to secondary drying stage 14 by a conveyor system represented by reference numeral 22.

Secondary drying stage 14 includes a secondary louvred drying drum 24. A secondary furnace 26 supplies heated air to louvred drying drum 24, and a secondary cyclone type air fan 28 draws the organic material and heated air through drum 24. The finally dried organic material emerging from drum 24 is then removed from the secondary drying stage by final conveyor 30 where it is graded and packaged as desired.

Referring next to FIGS. 1 to 5, primary drying stage 12 will now be described in detail. Primary furnace 16 is a conventional gas fired furnace which is rated at between 13 and 19 million B.T.U. capacity. Furnace 16 has a primary combustion air inlet represented by chain-dotted lines 32, and a secondary air inlet indicated by reference numeral 34. It is primarily the secondary air that is heated to be supplied to primary drying drum 18. The heated air supplied by furnace 16 ranges in temperature from 800 to 2,000° F., but the normal operating temperature is approximately 1,800° F. The specific form of primary furnace 16 is not considered to be part of the present invention and therefore will not be described in further detail.

An air supply throat 36 is located between primary furnace 16 and primary drying drum 18. As shown best in FIG. 2, supply throat 36 includes a roof portion 38, side walls 40 and a floor portion 42, all of which are formed of fire brick in a conventional manner. However, roof portion 38 and floor portion 42 have two transverse rows of laterally spaced-apart metal tubes 44 located therein. Two transverse rows of chains 46 are slidably located in metal tubes 44. The chains are suspended from horizontal bars 48 located on roof portion 38 so that the chains depend downwardly from roof portion 38. Each row of chains has six chains, and the chains are laterally offset to form a screen across air supply throat 36.

The purpose of chains 46 is to suppress or prevent sparks or flames from passing through air supply throat 36 into primary drying drum 18. Chains 46 are typically conventional iron or steel chains formed from ⅜ in. diameter rod material. These chains are generally oxidized or consumed by the high temperature airflow through air supply throat 36, so that the chains must be replaced approximately once per month. This is simply done by dropping the chains through metal tubes 44 to expose new lengths of chain to the inside of air supply throat 36. When the new chains are in place, metal tubes 44 are usually stuffed with asbestos fibre or other heat resistant packing material to seal the openings caused by the tubes.

Primary drying drum 18 is rotatably mounted on suitable foundation blocks 50 by conventional trunnion type rings 52 rotatably supported and guided by bearings 54. A conventional type drive including a ring gear 56 and a motor driven pinion 58 rotates primary drying drum 18 at between 8 and 20 rpm. A typical rotational speed of dryer drum 18 is 12 rpm.

An input chute or trough 60 feeds organic material to dryer drum 18. The organic material is fed to input trough 60 by a conveyor 62 which is loaded from a suitable hopper 64. An output housing 66 is located at the exit end of drying drum 18 to deposit the partially dried organic material onto conveyor 22. Suitable conventional sliding seals are provided between air supply throat 36 and the inlet end of drying drum 18, and between the outlet end of drying drum 18 and output housing 66.

The cyclone type air fan 20 draws heated air through primary drying drum 18 so that the velocity of the air through the drying drum is between approximately 350 and 600 feet per minute. This maintains a slight negative pressure in air supply throat 36 to prevent dust and toxic fumes from escaping from primary drying stage 12. Cyclone air fan 20 also separates any heavier organic material particals removed with the heated airflow and deposits same onto conveyor 22. The output from air fan 20 is then passed through conventional pollution control equipment which typically includes a dust collecting bag house, an air scrubber, a two-stage washer and a water settling tank. The air pollution equipment is not considered to be part of the present invention, and therefore will not be described in detail.

Figure 5:
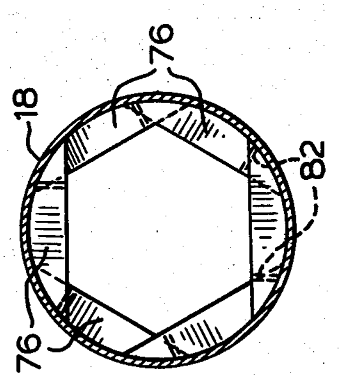
FIG. 5 is a vertical, transverse sectional view taken along lines 5—5 of FIG. 3.
Figure 4:
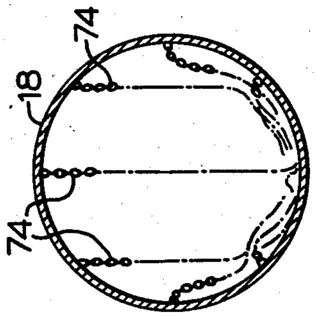
FIG. 4 is a vertical, transverse sectional view taken along lines 4—4 of FIG. 3.

Referring in particular to FIGS. 3, 4 and 5, primary drying drum 18 is shown having an inlet section 68 and an outlet section 70. Drying drum 18 is approximately six feet in diameter and approximately sixty feet in length, with inlet section 68 being approximately twelve feet in length and outlet section 70 being approximately forty-eight feet in length. Drying drum 18 is downwardly inclined from air supply throat 36 at an angle of approximately 3° from horizontal.

Inlet section 68 includes a plurality of transverse chain curtains 72 which are longitudinally spaced-apart at progressively wider intervals in a direction toward the outlet section 70. There are approximately fifteen chain curtains 72 in inlet section 68, although only seven chain curtains are shown in FIG. 3 for the purpose of clarification. The longitudinal spacing between chain curtains 72 is approximately three inches adjacent to air supply throat 36 and increases uniformly to a spacing of approximately ten inches adjacent to outlet section 70. As seen best in FIG. 4, chain curtains 72 are formed of eight chains 74 which are attached at one end to the inside surface of drying drum 18 at equal, circumferentially spaced-apart intervals. Each chain 74 is a few inches longer than the diameter of drying drum 18, so that as the drum rotates, the chains scrape and clean the drum inside surface, and the chains successively depend from the upper inside surface of the drum in the path of the flow of heated air and organic material through the drum. Chains 74 are formed from iron or low carbon steel, with the links being made from rod of a nominal diameter of approximately ½ inch. However, the links are circular to reduce wear, and the rod material used to make the links is oblong in cross-section to maximize heat transfer.

Outlet section 70 of drying drum 18 includes a plurality of vanes 76 attached to the inside of drum 18. Vanes 76 are angularly disposed to form an auger 78 which is like a double-start thread, and which tends to move the organic material toward inlet section 68, or contra the flow of heated air through drum 18 when drum 18 is rotated in the direction of arrow 80. Vanes 76 include laterally disposed paddles 82 which help lift the organic material as the primary drum 18 rotates, so that the heavier, more moist organic material is tumbled through the flow of heated air in the drying drum. There are approximately twenty-five to thirty-five hord-like vanes 76 in outlet section 70, and the vanes are longitudinally equally spaced along drying drum 18.

Referring again to FIG. 1, the organic material which emerges from primary drying drum 18 is transported to the secondary louvred drying drum 24 by a conveyor 22, which includes intermediate processing equipment generally indicated by reference numeral 84. Processing equipment 84 typically includes a separator for removing stones, pieces of metal or other undesirable objects. In the preferred embodiment, this separator includes a pair of adjacent, parallel rotating rubber cylinders. The organic material is fed into the nip of the cylinders and is accelerated. The heavier impurities having more inertia travel a different path than the desirable portion of the organic material, and therefore may be easily separated and discarded. Processing equipment 84 may also include a compactor or hammermill for breaking up lumps, or a paddle type mixer by which additives may be mixed with the organic material. Typical additives are enriching or weed control chemicals for fertilizer, ion-exchange chemicals for reduction of soil damage where the organic material has a heavy metal content, and also agents for assisting pelletization of the organic material. Alternatively, intermediate processing equipment 84 may be by-passed and the organic material may be fed directly into secondary louvred drying drum 24.

Referring next to FIGS. 1 and 6 to 10, secondary drying stage 14 will now be described in detail. The main component of secondary drying stage 14 is louvred drying drum 24. This basically is a conventional louvre-type dryer which has been structurally modified for the purpose of the present invention. Such a conventional type louvred dryer is manufactured by FMC of Canada Ltd., of Toronto, Canada, and is sold under the trade mark "Link-Belt". Drying drum 24 is rotatably mounted on suitable foundation blocks 86 using trunnion rings 88 attached to the outside of the drum and bearings 90, in a manner similar to those of primary drying drum 18. Secondary drum 24 is also driven by a ring gear 92 and motor driven pinion 94, again in a manner similar to primary drum 18. Secondary drum 24 rotates at a speed of approximately 12 rpm. Drum 24 is approximately twenty feet long, six feet in diameter and is inclined from the horizontal at an angle of approximately 3°.

Organic material is fed or introduced into louvred drying drum 24 by a central infeed chute 96. Ambient cooling air is supplied to drum 24 by an intake duct 98, and heated air is supplied to drum 24 by a supply duct 100, both ducts 98, 100 being located adjacent to the infeed end of drum 24. A furnace 102 supplies heated air to supply duct 100 at a temperature between 500 and 800° F. Furnace 102 is conventional and will not be described in further detail, however the furnace is rated at 9 million B.T.U. capacity in the preferred embodiment. At the output end of drum 24 a second output housing 104 receives the dried organic material emerging from drum 24 and deposits this material on final conveyor 30. Secondary cyclone air fan 28 is connected to output housing 104 to draw heated air and cooling air through drum 24, as discussed above, and to maintain a slight negative pressure in the secondary drying drum to prevent dust and fumes from escaping. This air travels through drum 24 at a velocity between 200 and 400 feet per minute. As in the case of air fan 20 in primary drying stage 12, secondary cyclone air fan 28 removes larger organic material particles from the air emerging from drum 24 and deposits these particles on final conveyor 30. The remaining air output drawn from drum 24, which may include fine dust particles or other pollutants, is fed into the primary combustion air supply of furnace 16 to obviate additional pollution control equipment.

Referring in particular to FIGS. 6 to 10, louvred drying drum 24 includes an input section 106, an output section 108 and a central pelletizing section 110 formed by adjacent portions of the input and output sections. Drying drum 24 includes an outer cylindrical shell 112 and an inner perforated concentric cylindrical shell 114. An intermediary cylindrical concentric shell 116 is located in input section 106 to define an air chamber which communicates with heated air supply duct 100 for supplying heated air to input section 106. Intermediary shell 116 thus also defines an air chamber communicating with cooling air intake duct 98 for supplying cooling air to output section 108. The space between perforated shell 114 and outer shell 112 is divided into a plurality of longitudinal chambers by longitudinal, radially disposed dividers 118. As seen best in FIG. 7, intake duct 98 and supply duct 100 correspond in dimensions to approximately two of the longitudinal air chambers in the lower left hand quadrant of drying drum 24, and end plate 120 with suitable seals closes the input end of drum 24, so that heated air and cooling air are passed longitudinally along drum 24 primarily in the lower left hand quadrant of the drum where the organic material to be dried is normally situate as the drum is rotated in the direction of arrow 122. Thus, heated air passes only through input section 106 and cooling air passes only through output section 108 of drying drum 24.

Figure 9:
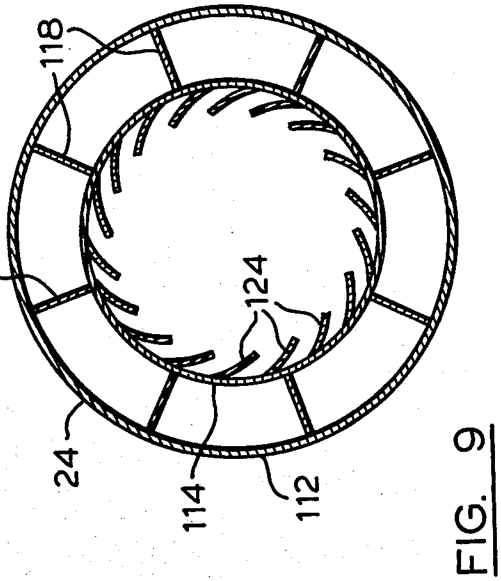
FIG. 9 is another vertical, transverse sectional view taken along lines 9—9 of FIG. 6.
Figure 7:
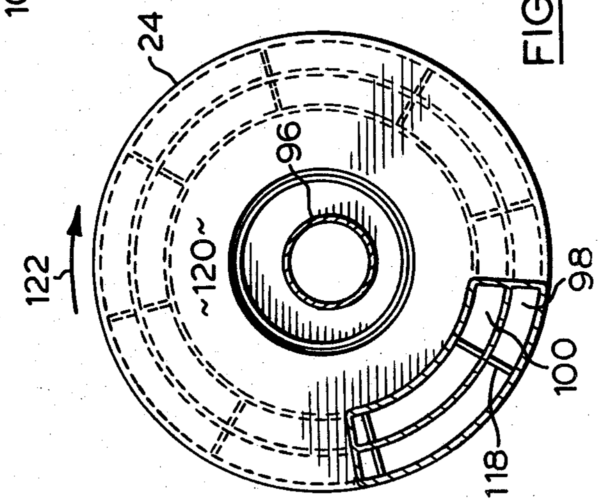
FIG. 7 is a vertical, transverse sectional view taken along lines 7—7 of FIG. 6.
Figure 10:
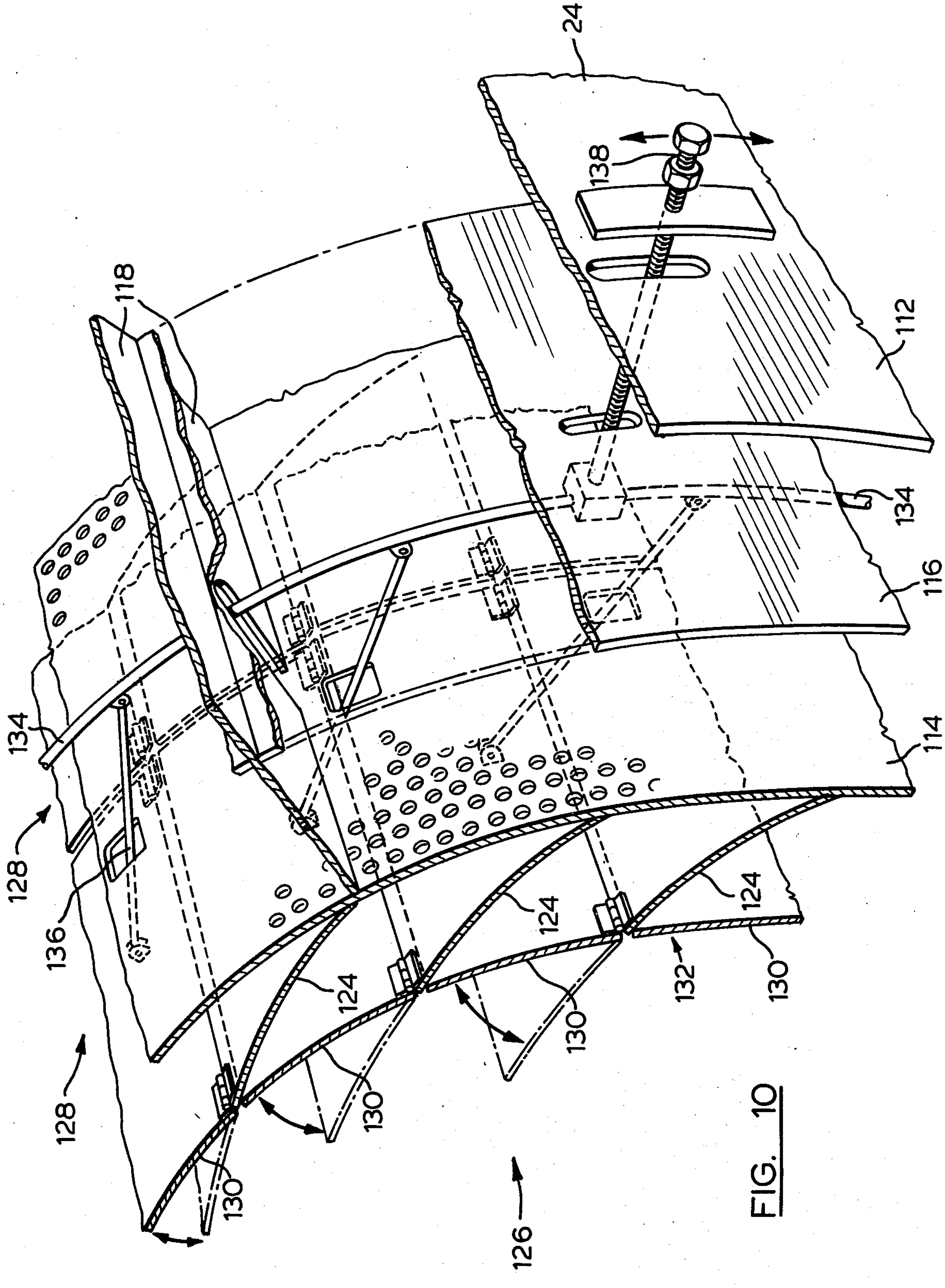
FIG. 10 is an enlarged perspective view of a portion of the adjustable baffle of the louvred dryer shown in FIGS. 6 and 8.

As seen best in FIGS. 9 and 10, drying drum 24 includes a plurality of longitudinal, circumferentially spaced-apart, radially inwardly disposed louvres 124, through which the heated air and cooling air passes to dry the organic material. Louvres 124 are part of the conventional louvred drying drum mentioned above.

Figure 6:
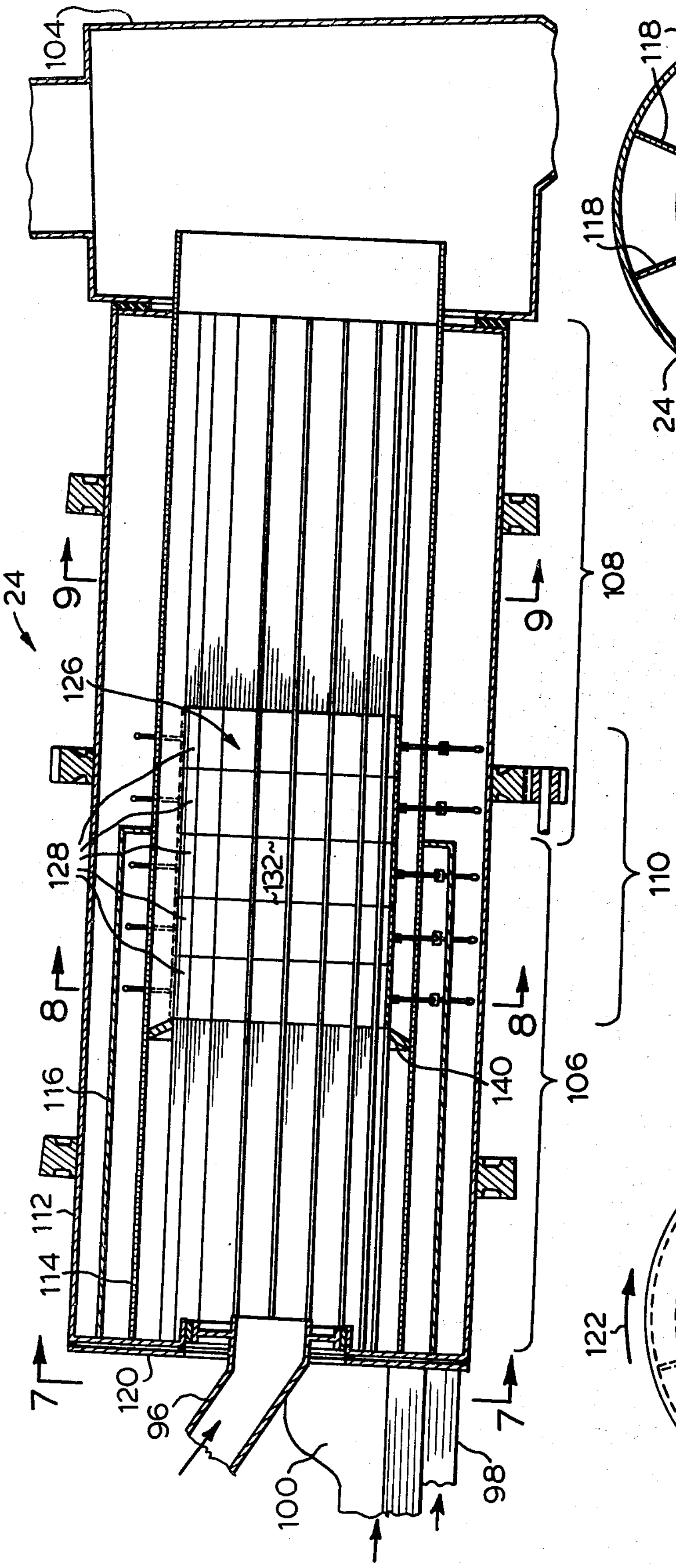
FIG. 6 is a longitudinal, vertical sectional view of the secondary louvred dryer shown in FIG. 1.
Figure 8:
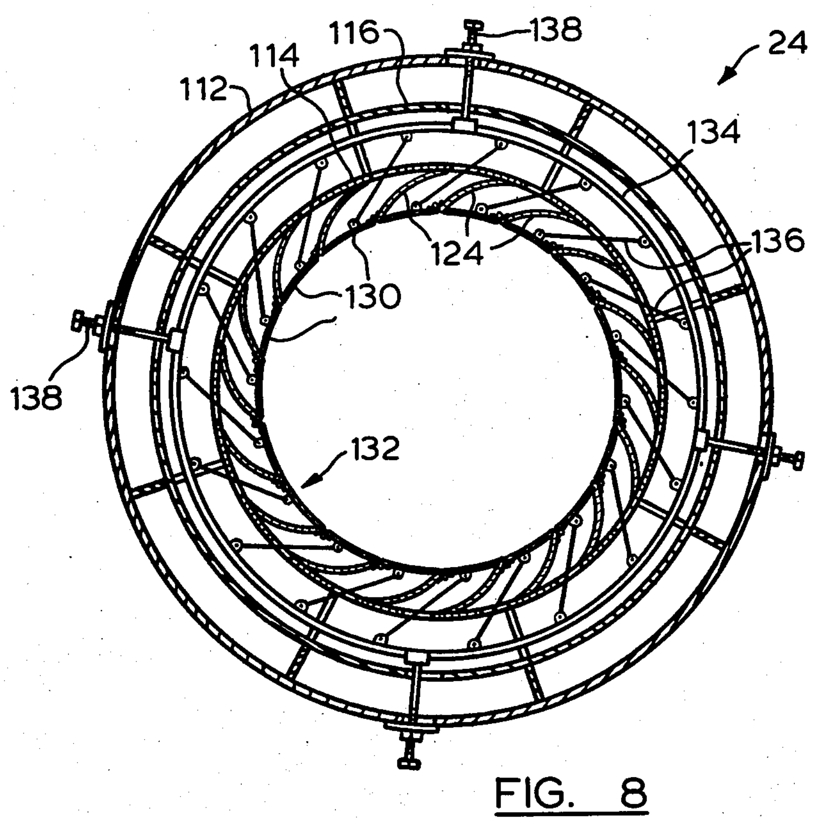
FIG. 8 is a vertical, transverse sectional view taken along lines 8—8 of FIG. 6.

As seen best in FIGS. 6 and 8, central pelletizing section 110 includes an adjustable baffle 126 for blocking airflow through the louvres in the pelletizing section. Baffle 126 is approximately six feet in length and includes five baffle element rows 128 having elongate baffle elements 130 (see FIG. 10) hingeably connected to the inner longitudinal edges of louvres 124 to block the airflow through the louvres. Each baffle element 130 is slightly transversely curved and extends circumferentially between adjacent louvres 124 to form a continuous generally smooth rolling surface 132 for each baffle element row 128. The hingeable movement of baffle elements 130 is controlled by concentric hoops 134 connected to the baffle elements by connecting links 136, so that as hoops 134 are rotated relative to louvres 124, the baffle elements 130 hingeably move between the position shown in chain-dotted lines in FIG. 10 to the position shown in solid lines closing the louvres and defining rolling surface 132. It will be appreciated, therefore, that when baffle elements 130 are in the position shown in chain-dotted lines in FIG. 10, adjustable baffle 126 acts like a normal louvred dryer. The configuration of each baffle element row 128 may be adjusted individually by radial adjustment rods 138. As a result, the longitudinal length of rolling surface 132 may be adjusted, and by opening or closing respective upstream and downstream baffle element rows, the longitudinal position of rolling surface 132 may also be adjusted. In order to assist the entry of the organic material into pelletizing section 110, an annular, conical collar 140 (see FIG. 6) is provided at the entrance to pelletizing section 110.

Figure 11:
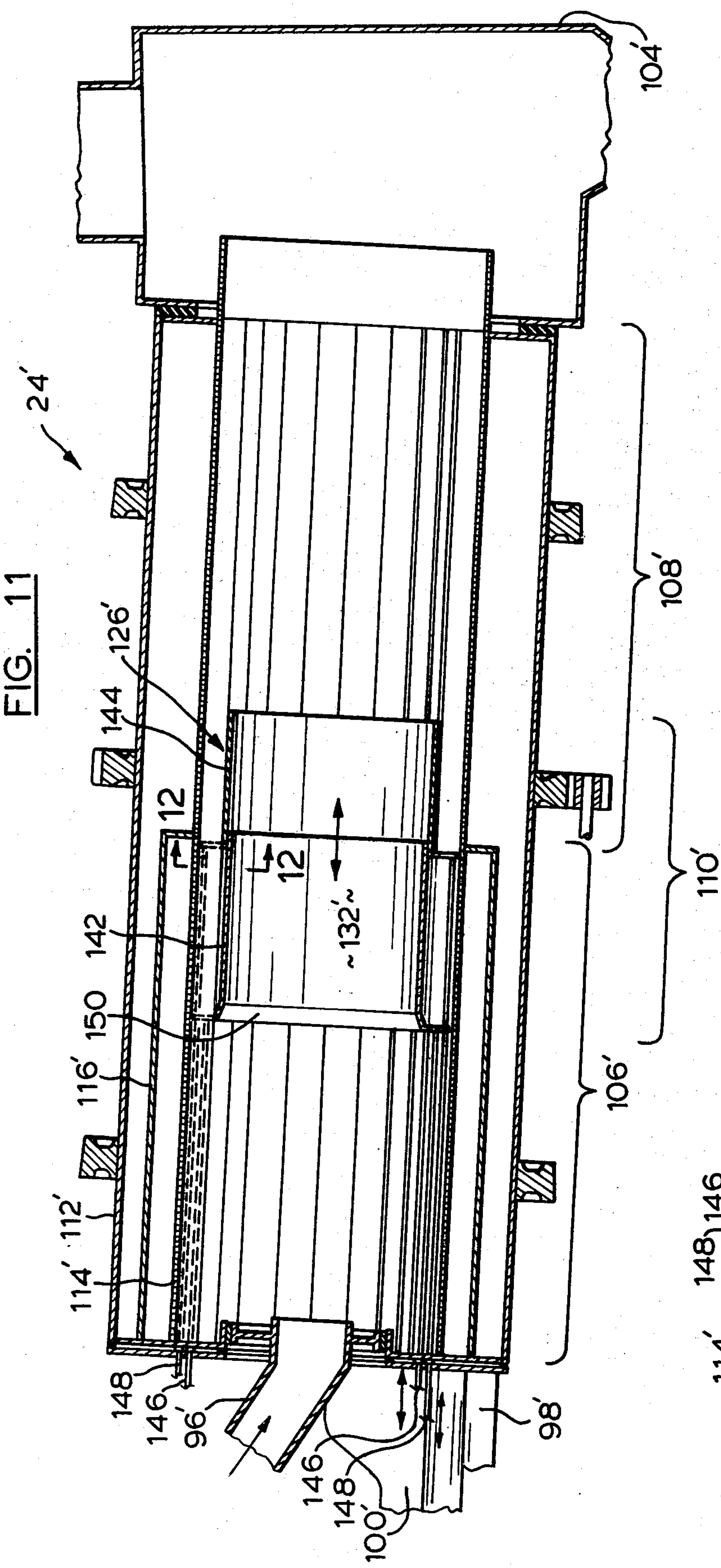
FIG. 11 is a longitudinal, vertical sectional view similar to FIG. 6, showing another embodiment of a louvred dryer drum and adjustable baffle.
Figure 12:
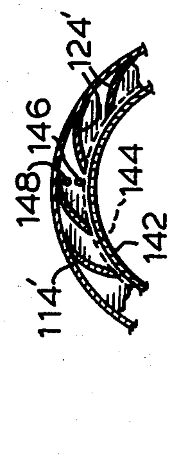
FIG. 12 is a vertical, partial, transverse sectional view taken along lines 12—12 of FIG. 11.

Referring next to FIGS. 11 and 12, another embodiment of a secondary louvred drying drum and adjustable baffle is shown, primed reference numerals being used to indicate parts similar to the louvred drum 24 previously described. The adjustable baffle 126′ includes an inner cylinder 142, and an outer cylinder 144. Cylinders 142, 144 are slidably located inside louvred drum 24′ adjacent to the longitudinal inner edges of louvres 124′. Cylinders 142, 144 are telescoping to adjust the longitudinal length of rolling surface 132′. Longitudinal connecting rods 146, 148 are respectively connected to cylinders 142, 144 for moving the cylinders relative to each other. Connecting rods 146, 148 are also moved simultaneously to adjust the longitudinal location of rolling surface 132′ along the length of louvred drying drum 24′. Inner cylinder 142 is provided with a peripheral flange 150 for assisting the entry of organic material into pelletizing section 110′.

The operation of drying apparatus 10 begins by feeding the organic material to be dried into primary drying drum 18, preferably at a uniform rate, ranging from approximately two to four tons per hour. As discussed above, almost any type of organic material may be dried in drying apparatus 10. Typical materials are animal waste, such as manure, which may have upwards of 40% moisture, and sewage or sludge, which may have up to 90 or 95% moisture. Heated air enters the primary drying drum at approximately 1,800° F. and at a velocity of approximately 500 feet per minute, and the heated airflow in combination with the rotation of drying drum 18 and the inclination of drying drum 18 results in the organic material progressing through the primary drum. The organic material is contacted by chain curtains 72 in inlet section 68. This primarily increases the heat transfer to the organic material through conduction and radiation, but chain curtains 72 also breakup lumps, scrub the inside surfaces of the drum, and extinguish any flames that may have a tendency to arise. Auger 78 in outlet section 70 maintains the organic material in the heated airstream until it is partially dried to a predetermined initial level, which is approximately 15 to 20% moisture content by weight.

The partially dried organic material is then transported by conveyor 22, and if desired, through intermediate processing equipment 84 as described above, to be fed into secondary louvred drying drum 24. Heated air at a temperature of approximately 550° F. passes through the louvres in input section 106 to further dry the organic material. The velocity of the airflow in drying drum 24 is approximately 300 feet per minute. The organic material then enters pelletizing section 110 where the flow of heated air and cooling air through the louvres is interrupted and the organic material is rolled by rolling surface 132 causing the organic material to form pellets. The longitudinal location of adjustable baffle 126 or rolling surface 132 is adjusted to make the organic material pelletize. If rolling surface 132 is too far upstream, the organic material will usually be too moist to be pelletized, and the material may cake, or stick onto, or bounce through the adjustable baffles. If rolling surface 132 is too far downstream, the organic material may be too dry, and again the material will not pelletize. However, once the longitudinal position of rolling surface 132 is located to obtain the desired pelletization, the longitudinal length of rolling surface 132 is adjusted to obtain the desired size of pellets. To decrease the size of the pellets, the longitudinal length of rolling surface 132 is decreased, and vice versa.

Once the pellets leave pelletizing section 110, the pellets are cooled and slightly further dried in output section 108, until they emerge from secondary louvred drying drum 24 having a moisture content of less than 10%. In addition to the final drying that occurs in output section 108, the cooling air causes some slight condensation on the downstream portion of adjustable baffle 126. This condensation, together with the cooling air, stabilizes the pellets by shrinking and hardening the outer surface of the pellets. This makes the pellets more resistant to abrasion and increases resistance to deterioration or breakdown in handling. This also produces pellets having "time-release" properties or delayed breakdown, which is particularly useful in fertilizer products.

It should be noted that certain organic materials cannot be pelletized in view of the composition of these materials. For example, manure which has a high straw content will not pelletize. In this case, all of the baffle elements in the adjustable baffle are opened, and the louvred drying drum is operated like a conventional louvred dryer for the purpose of secondary drying only.

Having described preferred embodiments of the inventions, it will be appreciated, that various modifications may be made to the apparatus and methods described above. For example, the direction of airflow through the drums could be opposite to the direction of material flow, but this would require some modification to assist movement of the material through the drums. It is possible that the drying air could be blown through the drums rather than drawn through the drums by suction fans. However, this would likely cause problems with pollution control in regard to escaping fumes and odours. Also, the positively pressurized drying drums may increase the tendency for explosions to occur.

It will be appreciated that other types of furnaces, fans and air pollution equipment could be used than those described above. Also, suitable controls would be required to keep the various perameters of the drying stages within acceptable operating limits. Other materials could be used for the chains in the primary drying stage, such as copper, but this would be more expensive than iron chains.

The present invention provides a very flexible drying system that can be used to dry and/or pelletize a variety of organic materials. The invention is particularly useful for the production of fertilizers using animal waste or sewage, but the invention may be used for the production of edible food products for humans or animals if desired. Generally, a very uniform, high quality product is obtained using the methods and apparatus of the present invention to dry organic raw material.

What I claim as my invention is:

1. Apparatus for drying and pelletizing organic material such as sewage, the apparatus comprising: an elongate, rotatable, louvred drying drum, having longitudinal, circumferentially spaced-apart, radially inwardly disposed louvres; the drying drum including an input section, an output section and a central pelletizing section formed by adjacent portions of the input and output sections; the input section being adapted to be connected to a supply of heated air at a temperature between 500 and 800° F.; the output section adapted to be connected to a supply of cooling air; means for feeding organic material into the input section; means for rotating the louvred drying drum; means for passing said heated air and cooling air through the louvres in the respective input and output sections to dry and cool the organic material; means for moving the organic material through the drying drum from the input to the output sections; an adjustable baffle located in the pelletizing section for blocking the airflow through the louvres in said pelletizing section; said baffle defining a continuous cylindrical rolling surface for rolling the organic material to form pellets; means for adjusting the longitudinal location of said rolling surface to control the location of said rolling of the organic material; and means for adjusting the longitudinal length of said rolling surface, whereby the duration of rolling and thus the size of the organic material pellets is controlled.

2. Apparatus as claimed in claim 1 wherein said means for passing said heated and cooling air through the louvres is a suction fan connected to the output section of the drying drum, and wherein said means for moving the organic material through the drying drum is primarily said flow of heated and cooling air.

3. Apparatus as claimed in claim 2 wherein said drying drum is downwardly inclined from said input section to said output section to assist in the movement of the organic material therethrough.

4. Apparatus as claimed in claim 1 wherein the adjustable baffle includes a plurality of elongate baffle elements hingeably connected to the inner longitudinal edges of the louvres and adapted to extend circumferentially to respective adjacent inner longitudinal louvre edges in the pelletizing section, whereby the baffle elements form said continuous rolling surface and block airflow through the louvres.

5. Apparatus as claimed in claim 4 wherein the adjustable baffle includes a plurality of longitudinally arranged rows of separately hingeable baffle elements, for longitudinal adjustment of the length of said rolling surface.

6. Apparatus as claimed in claim 1 wherein the adjustable baffle includes a pair of telescoping cylinders longitudinally, slidably located in the pelletizing section adjacent to the inner longitudinal edges of the louvres, whereby the cylinders may be moved longitudinally relative to the louvres to adjust the longitudinal location of said rolling surface, and the cylinders may be moved relative to each other to adjust the longitudinal length of said rolling surface.

7. Apparatus as claimed in claim 1 wherein the comprising means for drying the organic material before it is fed into the drying drum input section, so that the organic material has a moisture content between 10 and 30% by weight entering the drying drum.

8. Apparatus as claimed in claim 7 wherein said means for drying the organic material before it is fed into the drying drum includes: a rotatable, elongate primary drying drum having an inlet section and an outlet section; means for feeding the organic material into said inlet section; an air supply throat connected to the primary drum and adapted to be connected to a supply of air heated to a temperature between 800 and 2,000° F.; means for passing said heated air through said throat and thus through the primary drum; means for rotating the primary drum; the inlet section of the drum including a plurality of transverse chain curtains, the chain curtains including a plurality of chains attached at one end to the inside of the drum; the outlet section of the primary drying drum including a plurality of vanes attached to the inside of the primary drum, said vanes being angularly disposed to form an auger tending to move the organic material in a direction contra the flow of said heated air; and means for moving the organic material through the primary drum.

9. Apparatus for drying organic material such as animal waste or sewage, the apparatus comprising: a rotatable, elongate primary drying drum having an inlet section and an outlet section; means for feeding organic material into said inlet section; an air supply throat connected to the primary drum and adapted to be connected to a supply of air heated to a temperature between 800 and 2,000° F.; means for passing said heated air through said throat and thus through the primary drum; means for rotating the primary drum; the inlet section of the drum including a plurality of transverse chain curtains, the chain curtains including a plurality of chains attached at one end to the inside of the drum; the outlet section of the drum including a plurality of vanes attached to the inside of the primary drum, said vanes being angularly disposed to form an auger tending to move the organic material in a direction contra the flow of said heated air; means for moving the organic material through the primary drum; an elongate, rotatable, secondary louvred drying drum having longitudinal, peripheral, radially inwardly disposed louvres, the secondary drum having an input section and an output section; said input section being adapted to be connected to a supply of air heated to a temperature between 500 and 800° F., and said output section being adapted to be connected to a supply of cooling air; means for passing said heated air and said cooling air through said louvres in the respective input and output sections; means for rotating the secondary drum; transport means for conveying the organic material from the primary drum outlet section to the secondary drum input section; and means for moving the organic material through the secondary drum, so that the organic material may be partially dried in the primary drum and further dried in the secondary drum to a predetermined desired dry moisture level.

10. Apparatus as claimed in claim 9 wherein said air supply throat is connected to the primary drum at said inlet section.

11. Apparatus as claimed in claim 10 wherein said air supply throat includes a roof portion and a plurality of transverse rows of laterally spaced-apart chains depending from the roof portion, said rows being spaced-apart longitudinally.

12. Apparatus as claimed in claim 11 wherein said roof portion includes a plurality of tubes mounted therein, and wherein said chains are slidably located in said tubes so that the chains may be replaced by sliding additional lengths of chain through said tubes.

13. Apparatus as claimed in claim 9 wherein said chain curtains are formed of chains which are slightly longer than the diameter of the primary drum, and wherein said chain curtains are longitudinally spaced-apart at progressively wider intervals toward the outlet section.

14. Apparatus as claimed in claim 9 wherein said auger vanes include laterally disposed paddles to help lift the organic material as the primary drum rotates.

15. Apparatus as claimed in claim 9 wherein said chains of said chain curtains are attached to the inside of the primary drying drum at equal, circumferentially spaced-apart intervals.

16. Apparatus as claimed in claim 9 wherein said transport means includes a separator for removing foreign matter from the organic material.

17. Apparatus as claimed in claim 9 wherein said means for passing heated air through the primary drum is a suction fan connected to the primary drum outlet section, said suction fan being adapted to maintain a slight negative pressure in the air supply throat, and wherein the flow of heated air moves the organic material through the primary drying drum.

18. Apparatus as claimed in claim 9 wherein said means for passing heated air and cooling air through the secondary drum is a suction fan connected to the output section of the secondary drum, said suction fan being adapted to maintain a slight negative pressure in the secondary drying drum, and wherein the flow of heated air and cooling air moves the organic material through the secondary drying drum.

19. Apparatus as claimed in claim 18 and further comprising a furnace for supplying heated air to the primary dryer, and wherein the secondary drying drum suction fan output is connected to the primary combustion air supply of the furnace.

20. Apparatus as claimed in claim 17 wherein the primary and secondary drying drums are inclined downwardly from the respective inlet and input sections to the outlet and output sections to help move the organic material therethrough.

21. Apparatus as claimed in claim 9 wherein said secondary drying drum further includes a central pelletizing section formed by adjacent portions of the input and output sections; and further comprising an adjustable baffle located in the pelletizing section for blocking the airflow through the louvres in said pelletizing section, said baffle defining a continuous cylindrical rolling surface for rolling the organic material to form pellets; means for adjusting the longitudinal location of said rolling surface to control the location of said rolling of the organic material; and means for adjusting the longitudinal length of said rolling surface, whereby the duration of rolling and thus the size of the organic material pellets is controlled.

* * * * *